Jan. 22, 1957   W. R. BUSH   2,778,190
VARIABLE AREA NOZZLE FOR JET ENGINES
Filed June 8, 1950   5 Sheets-Sheet 1

INVENTOR.
Walter R. Bush
BY
Charles S. Wilson
ATTORNEY.

Jan. 22, 1957  W. R. BUSH  2,778,190
VARIABLE AREA NOZZLE FOR JET ENGINES
Filed June 8, 1950  5 Sheets-Sheet 3

INVENTOR.
Walter R. Bush
BY Charles S Wilson
ATTORNEY.

Jan. 22, 1957  W. R. BUSH  2,778,190
VARIABLE AREA NOZZLE FOR JET ENGINES
Filed June 8, 1950  5 Sheets-Sheet 4

INVENTOR.
Walter R. Bush
BY
Charles S. Wilson
ATTORNEY.

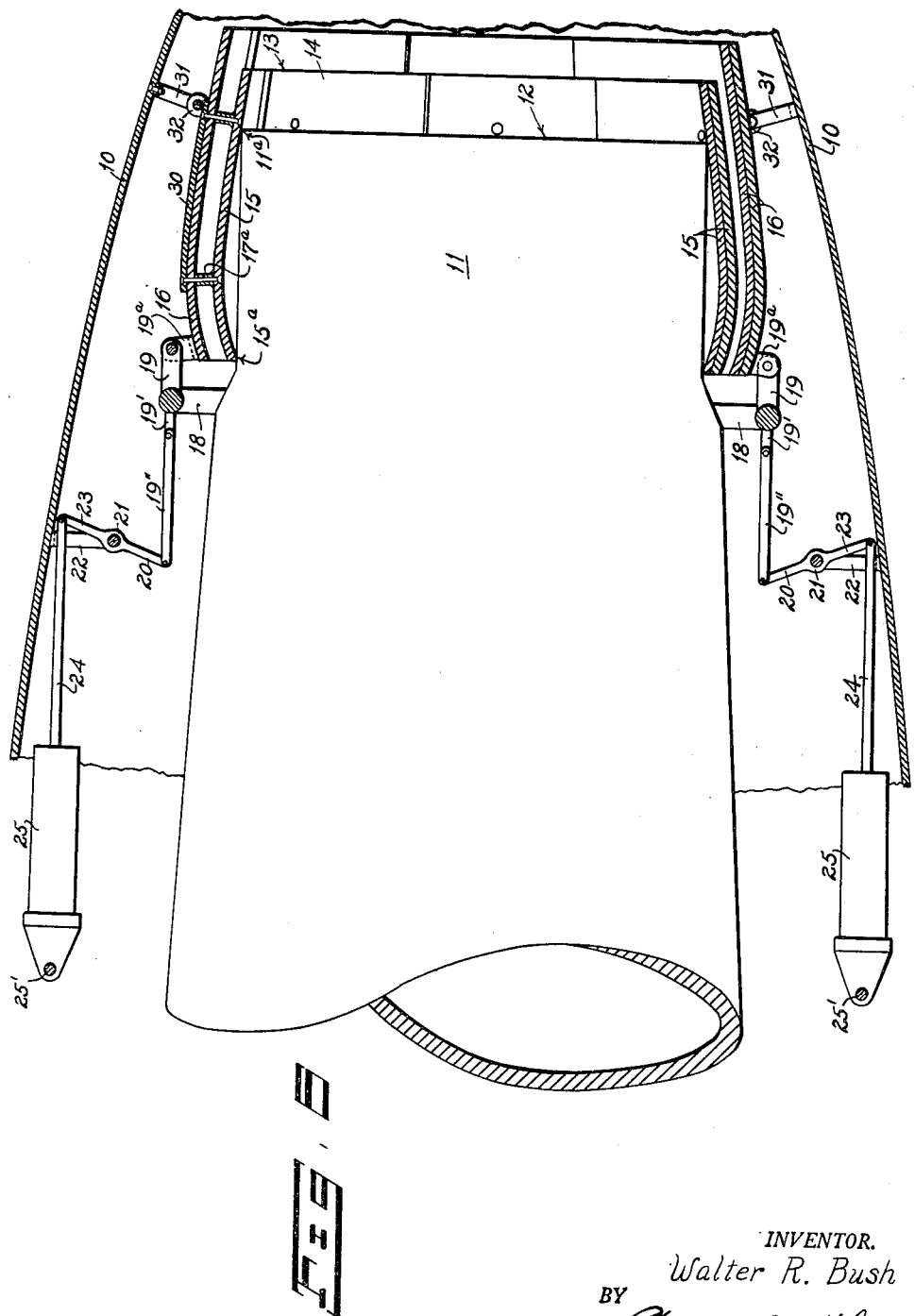

United States Patent Office 2,778,190
Patented Jan. 22, 1957

2,778,190

VARIABLE AREA NOZZLE FOR JET ENGINES

Walter R. Bush, Huntington, N. Y., assignor to Republic Aviation Corporation, Farmingdale, N. Y., a corporation of Delaware Application June 8, 1950, Serial No. 166,938

19 Claims. (Cl. 60—35.5)

This invention relates generally to devices for controlling a gas or gases passing through a conduit, and more specifically to a device that will control the pressure, velocity and temperature of said gas by varying the effective area of the exit orifice of said conduit.

More particularly, the present invention contemplates a nozzle which when associated with the exit end of the tail pipe or exhaust conduit of a jet power plant, determines the ultimate exit orifice of said pipe and may be adjusted to symmetrically reduce or enlarge the effective area of the nozzle and thereby alter or vary the characteristics, such as velocity and temperature, of the exhaust gases passing through the tail pipe and the nozzle.

Moreover, the nozzle proposed herein embodies means for cooling its structure and components so that the nozzle is capable of operating in the presence of substantially high degrees of temperature without deterioration or burning.

The instant invention also has in view the adjustment of the effective area of the exit orifice of the nozzle not only on the ground but in flight as well, and by such adjustment in flight establishes a control over the effective forward thrust developed by the jet power plant at any given speed of operation or revolutions per minute (R. P. M.). In short, without changing the speed or revolutions per minute of a jet power plant, the forward thrust developed thereby may be varied at will, merely by an adjustment of the area of the exit orifice of the nozzle and consequently of the tail or exhaust conduit.

With the above and other objects in view as will become apparent, this invention consists in the construction, combination and arrangement of parts all as hereinafter more fully described, claimed and illustrated in the accompanying drawings wherein:

Fig. 6 is a longitudinal section taken along lines 6—6 of Fig. 5.

Figure 1:
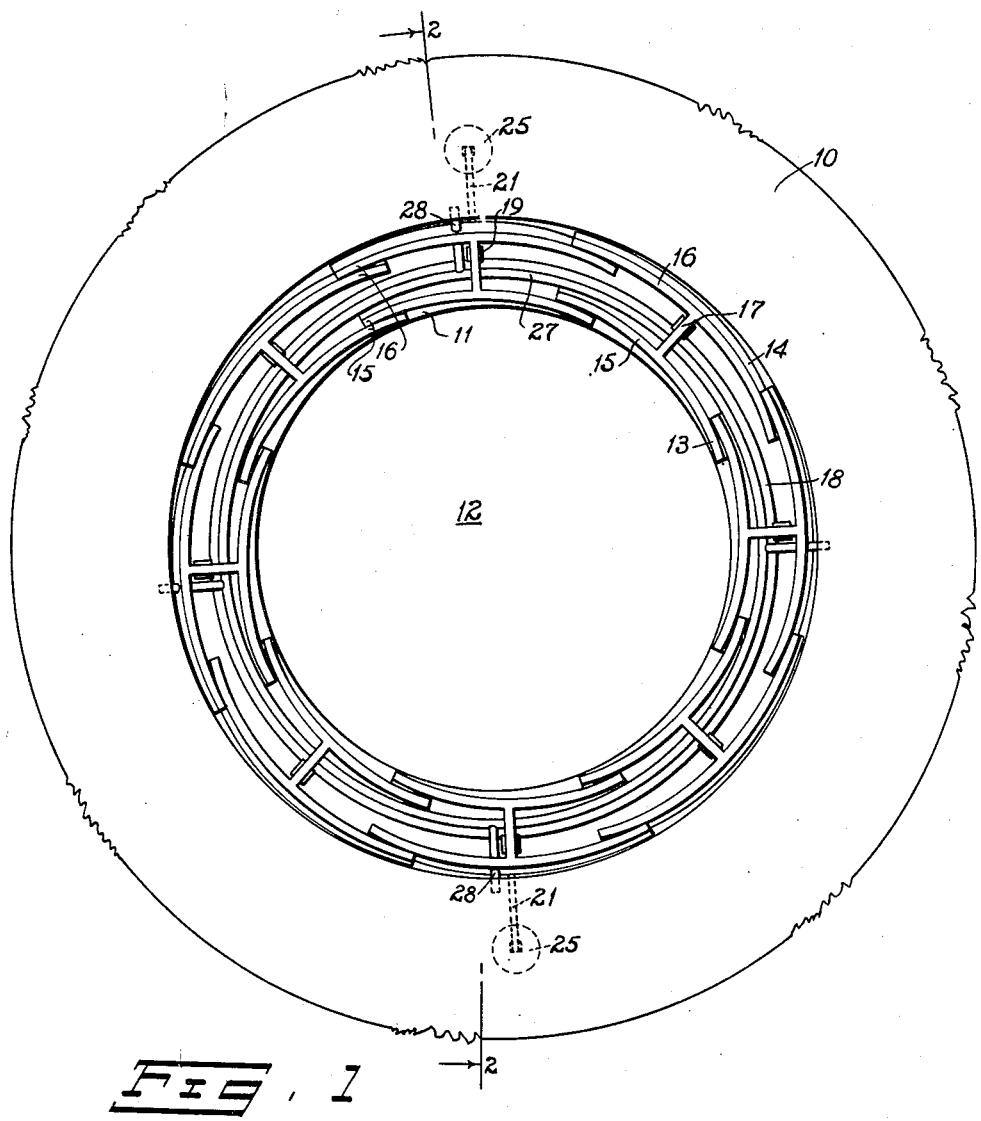
Fig. 1 is an end elevation looking forward of one form of the present nozzle showing it fully open.

The forward thrust developed by jet motors or engines is dependent on the temperature and velocity of the gases passing through the tail or exhaust pipe or conduit especially at the discharge extremity thereof. By controlling or varying the area of the discharge end of the tail or exhaust pipe the temperature and velocity of the gases passing through it may be regulated and determined. Furthermore, it has been found that high temperatures adversely affect the motor or engine and, in airplanes, the structure in the immediate vicinity of the engine and the tail or exhaust pipe.

To increase the power or thrust developed by jet power plants, especially by those used on aircraft, afterburning of additional fuel in the exhaust or tail pipe has been on occasion employed. After burning consists generally in injecting fuel into the tail pipe and igniting the fuel so injected, whereby the resulting combustion develops additional power or thrust by increasing the velocity and temperature of the exhaust gases. Under these circumstances, with the exit orifice or nozzle of the tail pipe having a fixed area, there may be and usually is a dangerous or critical increase in the temperature of the exhaust gases throughout the length of the tail pipe and also adjacent the turbine of the power plant resulting in overheating the turbine, tail pipe and the adjacent aircraft structure. In many instances, when the turbine overheats, it may completely fail due to the adverse effect on its structure by the critically high temperature of the exhaust gases.

In an effort to control the velocity and temperature of the exhaust gases, various means such as bullet valves, "clam shell" valves, etc., have been associated with the tail pipe to vary the effective area of the pipe or of its exit orifice and thereby provide an adjustment that can be used to prevent overheating of the power plant. All of these prior devices for regulating the effective area of the tail pipe, or of its exit orifice, have been objectionable. First, being mounted directly within the stream of the exhaust gases and being provided with no means of cooling they rapidly disintegrate and burn. Second, they cause a loss of power because of the skin friction developed by the passage of the exhaust gases over or around these valves or the components thereof. Third, in the case of a "clam shell" valve, the exit orifice created thereby is not, and cannot be, circular, or have a definite though adjustable area, as the pipe or exit orifice area established by such valve constantly changes due to the distortion and warpage of the shells under the intense heat to which they are subjected. Thus in designing a valve of this type it is impossible to accurately calculate and determine the exit orifice area for any adjustment of the shells.

The instant invention overcomes all of the objections to prior valves by providing a nozzle for the aft or rearward end of the tail pipe; or the exit orifice thereof that may be adjusted to vary the area of the exit orifice established by the nozzle and thereby control the temperature and velocity of the exhaust gases passing through said exhaust conduit. Thus, the temperature and velocity of the exhaust gases passing through or exiting from the exhaust conduit may be increased by decreasing the area of the exit orifice defined by the nozzle, or conversely may be decreased by increasing the area of said exit orifice. By mounting the nozzle as an axially aligned and direct continuation of the tail or exhaust pipe or conduit of a jet power plant the nozzle, regardless of its adjustment, and the tail pipe as well, is always unobstructed and no part of the nozzle is disposed in or across the exhausting stream of hot gases. In short, the nozzle forms a continuation of the tail pipe, whereby its exit orifice becomes in fact the exit orifice of the pipe and can be symmetrically and uniformly adjusted within its limits of adjustment to vary the area of this ultimate exit orifice.

It is also apparent that even where after-burning units are used in conjunction with a jet power plant, the increase in temperature occasioned thereby will have no adverse effect on the nozzle or its components because it can always be adjusted to compensate for any critical or unwanted temperature increase.

Since the variable exit orifice established by this nozzle is always substantially circular and therefore, particularly adaptable to relatively accurate calculation, the designing of the present nozzle is greatly simplified in comparison to the difficulty experienced in designing, for example, a "clam shell" valve and at the same time the accuracy of design is assured.

The tail or exhaust pipe of the jet power plant of an aircraft is customarily surrounded by airplane structure such as the aft end of the fuselage, or of the engine nacelle, and in many installations cooling air is circulated between the aircraft structure and the tail pipe of the engine. The subject nozzle embodies means for cooling the components or elements thereof either by the air circulated around the tail pipe, or by air independently provided for that purpose.

Additionally, by the positive adjustment of the nozzle herein contemplated, it is possible to control the amount of effective power or thrust developed by the jet power plant without necessarily changing the operational speed of the engine. For example, in landing an airplane powered by a jet engine, it is necessary to reduce speed during the approach to the runway by a "cut-back" of the throttle thereby reducing the supply of fuel to the engine, which in turn, reduces the operational speed or revolutions per minute (R. P. M.) of the engine as well as the effective power or thrust thereof. Thus, the speed of the engine has been decreased heretofore to provide safe landing speeds. If, however, an emergency should arise during the landing approach which requires full power from the engine in order to maintain or resume flight, the engine will not respond immediately to an increase in the fuel supplied to it and there will be a delay in time before the engine comes up to the desired speed and power or thrust to increase the speed of the airplane.

The variable area nozzle of this invention, however, permits the landing of an airplane without decreasing the operational speed or R. P. M. of the engine. By the adjustment provided in the present nozzle, it is possible to establish an exit orifice for the tail pipe or exhaust conduit that will permit the full speed operation of the engine without developing any appreciable power or forward thrust. Since by varying the effective area of the exit orifice of the tail pipe it is possible to vary the effective power or thrust developed by the jet engine, it follows, that where the tail pipe of a jet engine is provided with a variable area nozzle that can be adjusted in flight, the landing speed of the airplane may be controlled solely by varying the area of the exit orifice of the tail pipe as established by the nozzle, without changing the speed or R. P. M. of the engine. Thus, in the approach for landing, the pilot instead of "cutting back" the throttle as heretofore, can adjust the nozzle so as to open it wider, or increase the effective area thereof, thereby reducing the power or forward thrust developed by the engine while maintaining its speed. Should the full power of the engine then be needed, the closing of the nozzle to reduce the effective area of its exit orifice will immediately increase the forward thrust of the engine and increase the speed of the aircraft regardless of the unchanged throttle position.

It is to be understood, that the control of the effective forward thrust developed by the engine, is not limited in its application to landing an aircraft. For example, it is advantageous to be able to suddenly increase or decrease the speed of the airplane to assist in the maneuvering thereof without altering the operational speed of the engine. This can be accomplished as above pointed out, by simply varying the area of the exit orifice of the nozzle whereby an increase or decrease in thrust of the engine is immediately available and the airplane is thus capable of a greater maneuverability.

Figure 2:
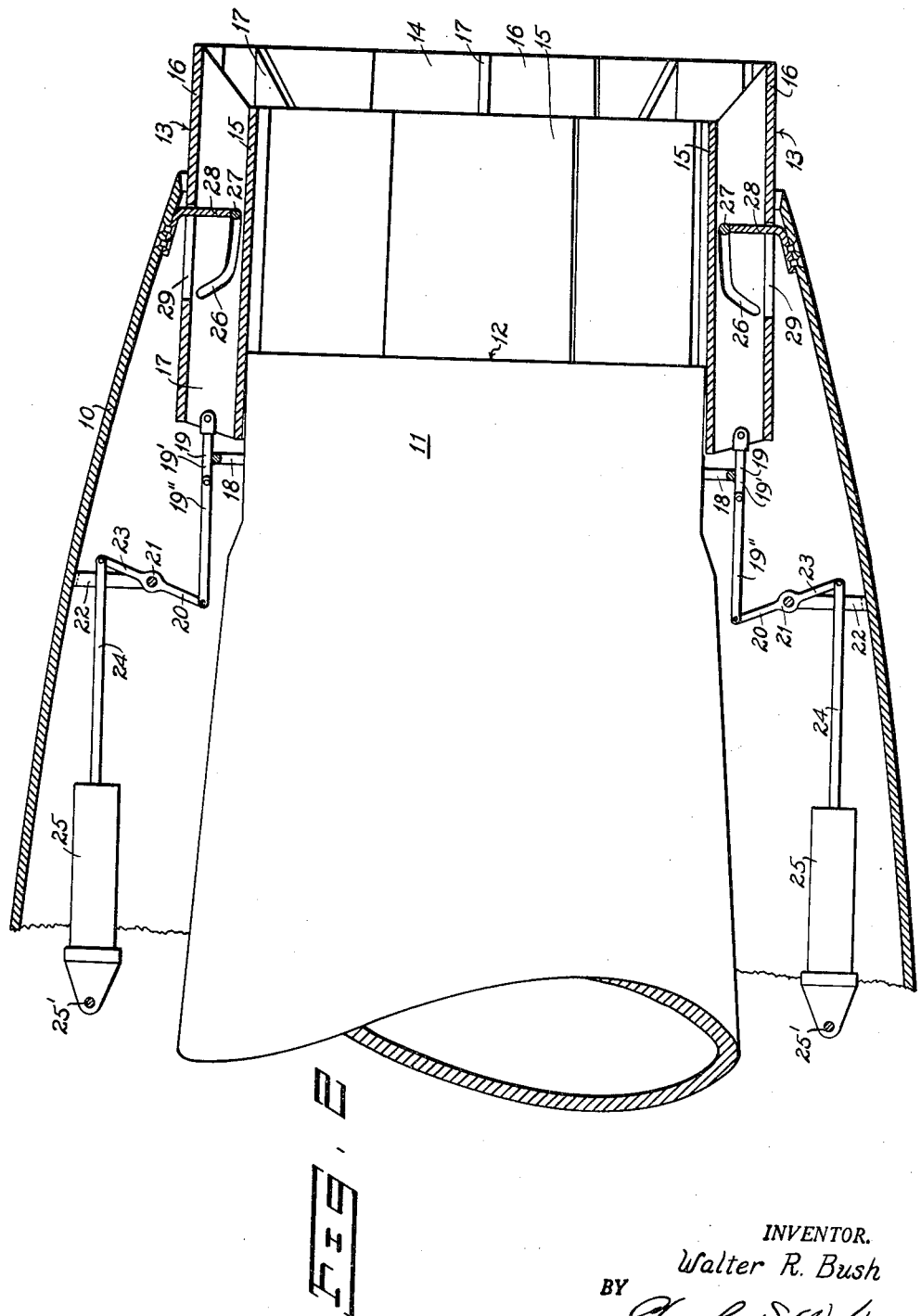
Fig. 2 is a section taken along line 2—2 of Fig. 1 showing the nozzle fully open, i. e., with the exit orifice adjusted to its greatest area.
Figure 3:
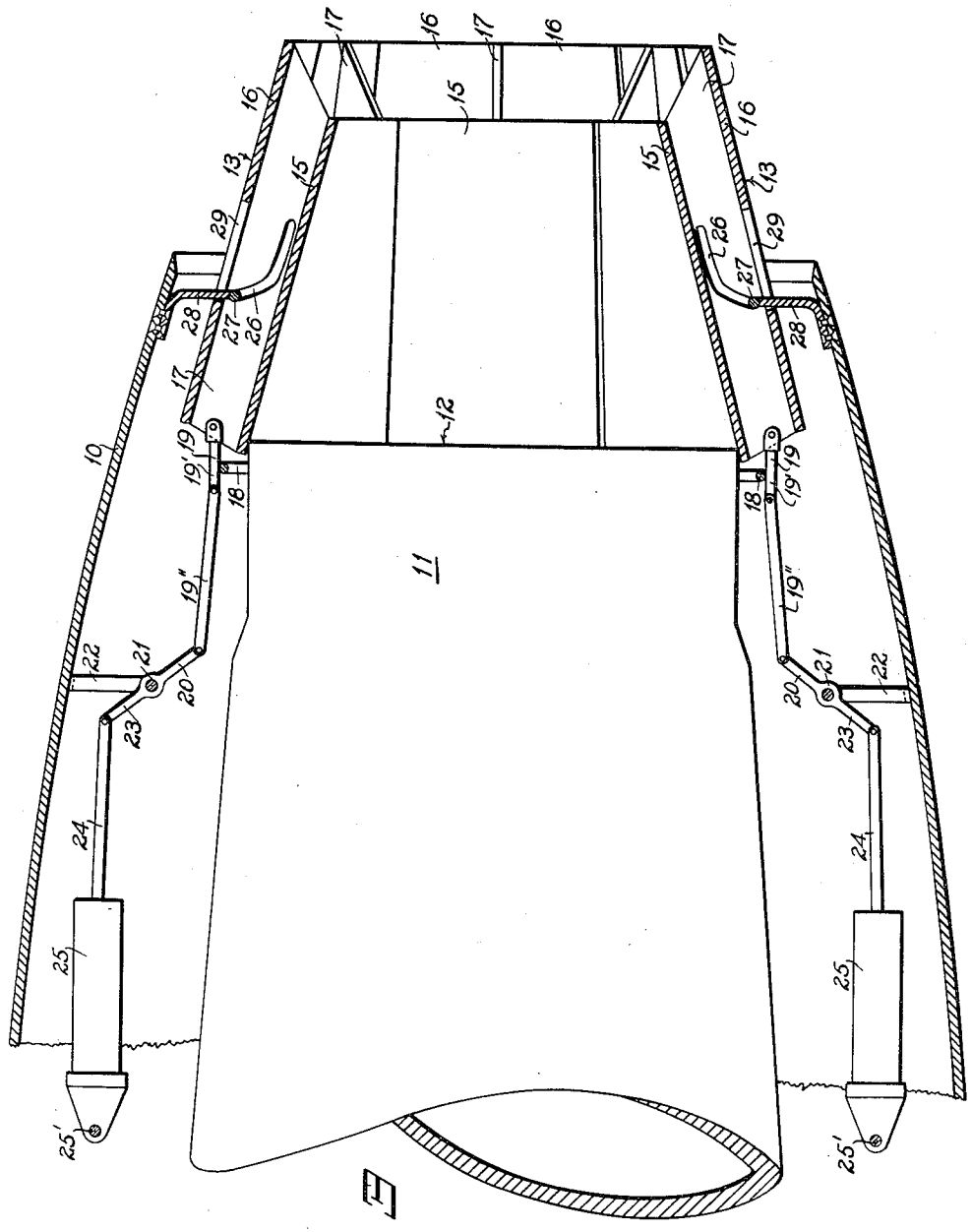
Fig. 3 is also a section taken along line 2—2 of Fig. 1 but shows the nozzle fully closed i. e., with the exit orifice thereof symmetrically reduced to its smallest area.

Reference being had more particularly to the drawings and especially to Figs. 1 to 3 inc., 10 designates the aft and rear part of an aircraft structure, such as a fuselage or engine nacelle, in which is located the tail pipe 11 of a jet engine (not shown). The diameter of the pipe 11, and particularly of the extreme end portion thereof is such that its exit orifice 12 is sufficiently large to permit the operation of the jet engine at maximum R. P. M. or speed without developing any appreciable effective forward thrust or power, and in the instances where afterburning units are used in conjunction with the normal jet engine power source, it is also large enough to permit this without critical increase of temperature. Once established the size or diameter of the exit orifice 12 of the tail pipe 11 is fixed and unalterable.

In order to control the temperature, pressure and velocity of the exhaust gases passing through and discharged by the tail pipe 11, an adjustable nozzle, generally indicated as 13, encircles and is slidably mounted on the aft or outer end thereof to project beyond the end of the pipe where it serves to define an auxiliary or supplemental exit orifice for the exhaust gases which for all practical purposes functions as the ultimate exit orifice of the tail pipe. The nozzle 13 is so constructed, organized and arranged that the effective area of the auxiliary exit orifice formed and defined thereby may be symmetrically varied by sliding the nozzle 13 longitudinally of and relative to the rear or outer end portion of the tail pipe 11. When the nozzle 13 is in its most forward or inward position as shown in Fig. 2, the nozzle 13 is fully open and the effective area thereof is substantially equal to, or perhaps slightly less than, the area of the exit orifice 12 of the tail pipe 11. In this position, the nozzle has little or no effect on the exhaust gases passing through and being discharged from the tail pipe 11 since it then merely constitutes a continuation of the tail pipe.

As the nozzle 13 is moved rearwardly and outwardly of the tail pipe 11 toward the position shown in Fig. 3, the effective area of its exit orifice symmetrically decreases, or becomes substantially smaller than the diameter of the tail pipe 11, with the result that the temperature and velocity of the exhaust gases passing through the conduit 11 and the nozzle 13 are increased. Concurrently, with the reduction of the area of the exit orifice of the nozzle and the increase of the temperature and velocity of the exhaust gases as aforesaid, the effective forward thrust developed by the engine increases in direct proportion to the decrease in area of the exit orifice of the nozzle but without change in the operational speed of the engine.

It is apparent, therefore, that the nozzle 13 serves as a means of varying or altering the effective area of the ultimate exit orifice of the tail pipe 11 and by virtue of this variation or adjustment the characteristics of the exhaust gases as well as the effective forward thrust developed by the jet engine may be controlled with exactitude.

In that embodiment of the invention shown in Figs. 1 to 3 inc., the nozzle 13 comprises a plurality of nozzle sections 14 adapted to slidably embrace the aft or outer end of the tail pipe 11. Each section 14 consists of an inner leaf 15 and an outer leaf 16 laterally curved throughout their lengths to generally follow or conform to the outside contour of the tail pipe 11. Each pair of leaves 15 and 16 forming a section 14 are fixedly secured one to the other approximately at or along their longitudinal center lines by a rigid web 17. Thus, each section 14 comprises the relatively immovable leaves 15 and 16 held in spaced and substantially parallel relationship by the web 17. The outer leaf 16 is somewhat longer than the inner leaf 15 and is positioned and held by the web 17 to project beyond the aft or outer limits of the inner leaf 15 while the inner leaf 15 is positioned and held by the web 17 to project slightly beyond the forward or inner limits of the leaf 16. In other words, while the leaves 15 and 16 are held fixed in spaced parallel relationship, they are relatively staggered so that the outer leaf 16 at the outer or aft end of the nozzle 13 projects beyond the extremity of the inner leaf 15 and at the inner or forward end of the nozzle 13 the inner leaf 15 projects beyond the extremity of the outer leaf 16. It is manifest that the exit orifice per se of the nozzle 13 is defined by the extreme rear or outer ends of the inner leaves 15.

Each section 14 of the nozzle is secured to an operating ring 18 by a push-pull rod 19 having one of its ends pivotally secured to the forward or inner end of the web 17 and its opposed end welded or otherwise fixedly attached to the operating ring 18. The rods 19 of the several sections 14 are disposed in spaced relationship around the ring 18 and position each section 14 so that the longitudinal edges of the leaves 15 and 16 of one section 14 overlie or overlap the longitudinal edges of the leaves 15 and 16 of the section 14 adjoining one side thereof, while the opposite longitudinal edges of the leaves 15 and 16 of this section 14 underlie the leaves 15 and 16 of the section 14 adjoining the other side thereof. Stated otherwise, the sections 14 are so disposed about and secured to the operating ring 18 that the opposed longitudinal edges of the leaves 15 and 16 alternately overlap and underlie each other.

The diameter of the operating ring 18 is greater than the diameter of the tail pipe 11 so that when the nozzle 13 is in operative position on the outer end of the tail pipe, the operating ring 18 encircles and is spaced from the surface of the tail pipe, while the inner surfaces of the leaves 15 of each section 14 slidably embrace and contact the outer or the aft end of said pipe.

Any suitable means may be employed to move the operating ring 18 longitudinally of the tail pipe 13 and thereby slide the sections 14 of the nozzle 13 in unison relative to the outer end portion thereof. An example of such means may comprise the extensions 19' of a pair of the rods 19 diametrically disposed with reference to the ring 18, which project beyond the ring 18 where they are pivotally connected at their ends to the connecting rods or links 19''. The opposite end of each connecting rod or link 19'' is pivoted to an arm 20 of a bellcrank 21 mounted to swing on a bracket 22 secured to the aircraft structure 10. The other arm 23 of said bellcrank 21 is pivotally secured to a driving rod 24 which is reciprocated by a motor or jack 25 pivotally mounted on the aircraft structure 10 by a pin 25'. Thus, when the motor or jack 25 is actuated to reciprocate the rod 24 the movement of the latter swings or oscillates the bellcrank 21 to exert a pull or push upon the connecting link or rod 19'' and thereby move the operating ring 18 longitudinally of the pipe 11 and slide the sections 14 of the nozzle 13 in unison relative to the extremity of said pipe. It is evident that the operation of the motors or jacks 25 in unison, in one direction, causes the sliding movement of the nozzle 13 outwardly of the outer end portion of the pipe 13 while their operation in the opposite direction causes the sliding movement of the nozzle inwardly of the outer end portion of the pipe 13.

Since any of the presently known means of remotely and selectively controlling the motors or jacks 25 may be employed such means are not illustrated or described. It is merely required to place the control means adjacent the pilot in order to permit the ready operation thereof during flight. Furthermore, while power means for actuating the nozzle 13 has been illustrated as being the two motors or jacks 25, it is to be understood that any type or method of actuating the nozzle 13 may be used. Neither the power source nor the connections between it and the operating ring 18 per se forms a part of this invention, it being obvious that any one of many means may be suitable to move the ring 18 longitudinally of the pipe and that that shown is merely an example of one such means.

In order to maintain the sections 14 of the nozzle 13 in their sliding engagement with the tail pipe 11 and to provide means whereby they may be moved relatively to each other as well as radially relative to the tail pipe 11 during their reciprocatory longitudinal movement by the ring 18, each web 17 is provided with and pierced by a cam slot 26 in which is seated a continuous controlling ring 27 fixedly carried by brackets 28 attached to the aircraft structure 10 outwardly or aft of the extremity of the tail pipe 11. This ring 27 passes through all of the slots 26 and encircles the inner leaves 15 of all of the sections 14. The controlling ring 27 being disposed between the leaves 15 and 16 of the several sections 14 and being fixedly secured to the aircraft structure 10 aft or outwardly of the discharge end of the tail pipe 11, permits the reciprocation of the nozzle 13 relative to this ring. To further that end several, and in some instances all, of the outer leaves 16 are pierced by relatively short longitudinal slots 29 to one side of the web 17 through which the brackets 28 project. These slots 29 in the outer leaves 16 of the several sections 14 are long enough to compensate and allow for the full reciprocation of the nozzle 13 from its open position shown in Fig. 2 to its partially closed position shown in Fig. 3 and vice versa.

When the nozzle 13 is in its most inward or forward position relative to the exit orifice 12 of the tail pipe 11 (Fig. 2), the sections 14 and their leaves 15 and 16 are substantially parallel to the tail pipe 11 and form a uniform extension or continuation thereof. Therefore, the area of the exit orifice of the nozzle as defined by the aft or outer ends of the inner leaves 15 is approximately equal to the area of the exit orifice 12 of the tail pipe 11. In this position the controlling ring 27 is disposed at the aft or outer ends of the cam slots 26 in the webs 17 and the brackets 28 are similarly situated in the longitudinal slots 29 in the outer leaves 16. Any tendency to outward radial movement of the aft or outer end portions of the sections 14 when thus positioned is prevented or counteracted by the engagement of the control ring 27 in the cam slots 26, and the forward or inner end portions of the sections 14 are held in place by the rods 19 and operating ring 18.

As above set forth, the area of the exit orifice of the nozzle 13, when adjusted as shown in Fig. 2, is substantially equal to the area of the exit orifice 12 of the tail pipe 11 and therefore, has little or no effect on the exhaust gases passing therethrough. However, inasmuch as the inner leaves 15 are somewhat shorter than the outer leaves 16, a low pressure area is developed between the aft or outer ends of the leaves 15 and 16 as the exhaust gases pass through the exit orifice of the nozzle. As a result of this low pressure area, the air normally present and circulating in the space between the inner surface of the aircraft structure 10 and the outer surface of the tail pipe 11, is sucked or drawn through and between the leaves 15 and 16 thus cooling these leaves as well as the other elements of the nozzle. It is not necessary to depend on the air circulating in the space between the aircraft structure 10 and the tail pipe 11 for cooling the nozzle 13 and its parts as aforesaid. Relatively small slots or opens (not shown) can be provided in the structure 10 in substantial transverse alignment with the inner or forward end of the nozzle 13 when positioned as shown in Fig. 2 and following well known aerodynamic principles, at least part of the airstream passing over the exterior of the aircraft structure 10 will be diverted through these slots or openings to be discharged through the spaces between the leaves 15 and 16 of the several sections 14 of the nozzle 13, thereby cooling the components of the nozzle. It is manifest that any suitable or adaptable source of cooling air to be circulated between the leaves 15 and 16 of the several sections 14 may be used.

As the motors or jacks 25, or other driving means, are actuated to reciprocate the operating ring 18 the movement thereof in one direction slides the nozzle 13 rearwardly on or outwardly of the tail pipe 11 while the movement thereof in the opposite direction slides the nozzle inwardly of or forwardly on said pipe. During the rearward or outward movement of the nozzle 13 the cam slots 26 operate against the fixed and stationary control ring 27 in such a manner as to tilt or incline the sections 14 radially toward the center of the tail pipe 11 about the edge or end of said tail pipe 11. Under these circumstances the end of the tail pipe 11 serves as a fulcrum about which the sections 14 pivot during both their rearward or outward and forward or inward movements as parts of the nozzle 13. As the sections 14 move outwardly or rearwardly the shape of the nozzle 13 changes from substantially cylindrical to frustro conical and during their forward or inward movements the shape of the nozzle 13 changes from frustro conical to cylindrical. During these movements and changes the sections 14 move or slide relatively one to the other circumferentially of the nozzle and in this manner the exit orifice defined by the aft or outer edges of the leaves 15 becomes increasingly and symmetrically smaller or larger in area as the nozzle 13 moves rearwardly or forwardly on the tail pipe 11 but always remains substantially circular regardless of its area or the adjustment thereof.

As explained, the adjustment of the effective area of the exit orifice of the nozzle 13 serves to control the temperature and velocity of the exhaust gases passing through the tail pipe 11 and discharged through the nozzle, since a decrease or increase in the area of the exit orifice respectively results in a proportional increase or decrease in both the temperature and velocity of the exhaust gases exiting from the nozzle.

Furthermore, when the sections 14 are thus inclined inwardly, and the area of exit orifice is decreased, the pressure in the area immediately adjacent the aft or outer ends of the leaves 15 is substantially lowered with the result that a greater amount of cooling air is drawn between the leaves 15 and 16 of each section 14 thus cooling the nozzle 13 to a greater degree in the presence of the increased temperature.

Figure 4:
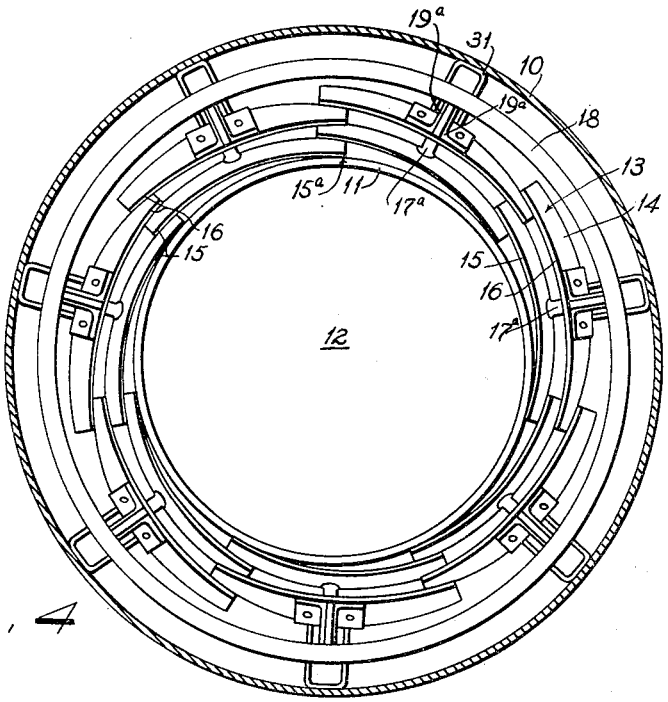
Fig. 4 is an end elevation looking aft of another embodiment of the subject nozzle and illustrates the nozzle adjusted to its fully open position.
Figure 5:
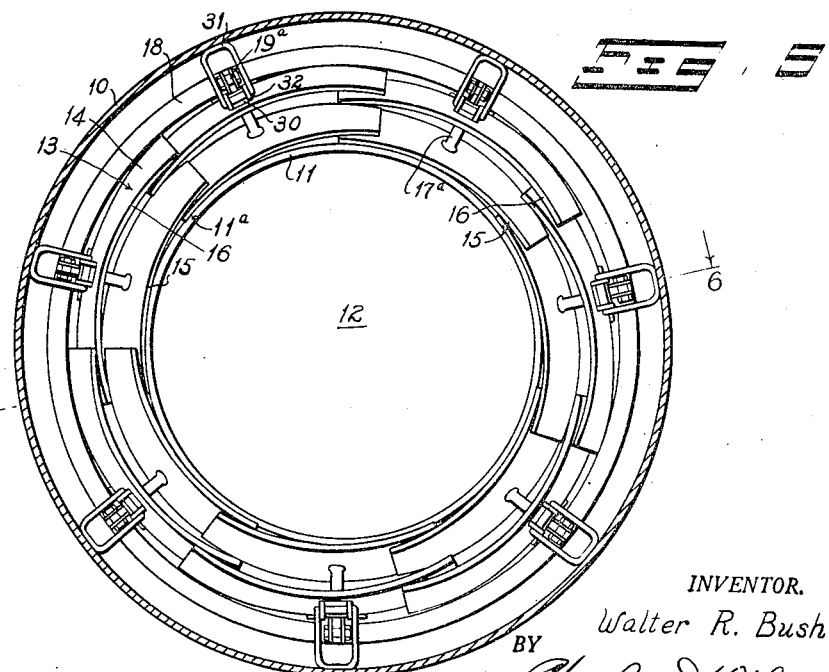
Fig. 5 is an end elevation looking forward of that form of the invention shown in Fig. 4.

Another embodiment or form of the present nozzle is illustrated in Figs. 4 to 6 inc. Here the nozzle 13 in its principal features is the same as that shown in Figs. 1 to 3 and comprises a series of sections 14 each consisting of an inner and outer leaf 15 and 16 respectively held in spaced superposed relationship by a series of studs or bolts 17a interposed between and fixedly secured at their ends to the outer surface of the leaf 15 and the inner surface of the leaf 16 generally along the longitudinal center lines of the leaves. The leaves 15 and 16 of the nozzle sections 14 are, in this form of the invention, provided with compound curvatures by being bent or curved both transversely and longitudinally first to follow and conform to the curvature of the tail pipe 11 and second, to provide a cam action to converge or diverge the sections 14 as will be described.

The sections 14 are attached to the operating ring 18 by the rods 19 each of which is welded or otherwise permanently and rigidly secured to the ring 18 at one of its ends and at the other of its ends is pivoted to an outstanding ear 19a carried by and fixedly attached to the outer surface of a leaf 16. The rods 19 are so secured to and disposed around the ring 18 that the opposed longitudinal edges of the leaves 15 and 16 of each section 14 alternately overlie or underlie the adjoining longitudinal edges of the leaves 15 and 16 of the next adjacent sections 14.

To guide the sections 14 in their rearward or outward and forward or inward movements and to prevent any outward radial movement thereof that would displace the sections 14 from sliding contact with the aft extremity of the tail pipe 11, each leaf 16 is provided with a guide track 30 that is fixedly secured to the outer surface of said leaf and positioned on the approximate longitudinal center line thereof. A plurality of brackets 31 are fixedly secured to the aircraft structure 10 immediately adjacent its aft end and to the rear of the outer extremity of the tail pipe 11 and each carries a flanged roller 32 that spans the aligned or cooperating track 30 to engage the sides thereof between its flanges. The face of each roller 32 operates on and against the outer surface of its coacting track 30 while its flanges are positioned to operate against the edges or sides thereof. It is to be noted that the rollers 32 merely serve to guide the longitudinal movements of the nozzle sections 14 and to prevent any outward radial movement of these sections that may result from pressure of the exhaust gases passing through and discharged by the nozzle. The rollers 32 in combination with the tracks 30 do not in and of themselves cause the sections 14 to fulcrum about the extremity of the pipe 11, as do the cam slots 26 and control ring 27 in that form of this nozzle illustrated in Figs. 1 to 3 inc. However, they do maintain sliding contact between the inner leaves 15 of the several sections 14 of the nozzle and the extreme outer end of the tail pipe 11. The variation of the area of the exit orifice of the nozzle 13 in Figs. 4 to 6 inc. as the nozzle is moved relatively to and longitudinally of the tail pipe 11 is the function of the movement of the sections 14 about the extremity of the tail pipe and is accomplished primarily by the cam action between the inner leaves 15 and the outer extremity of the pipe or conduit 11.

Regardless of the position of the nozzle 13 on the tail pipe 11 its sections 14 have two points of contact with the latter, viz., at the extreme inner ends 15a of the inner leaves 15 and where the inner leaves 15 bear on the aft or rearward extremity 11a of the tail pipe. Between these points of contact both the leaves 15 and 16 of the several sections 14 curve outwardly from the tail pipe and it is this curvature in combination with the rollers 32, the tracks 30 and the fixed brackets 31 that causes the outer extremities of the section 14 to radially converge beyond the end of the tail pipe or reversely to radially diverge. Therefore, the surface of each leaf 15 coacting with or bearing on the extremity of the tail pipe 11 acts somewhat as a cam in cooperation with the tail pipe 11 and the rollers 32. As the nozzle 13 is moved rearwardly or outwardly the leaves 15 slide over the aft or outer extremity of the tail pipe 11 but remain in contact therewith so that the outer ends of sections 14 converge toward the center of the pipe and thereby reduce the area of the exit orifice defined by the aft extremities of the leaves 15. Moreover, as the sections 14 move rearwardly or outwardly they slide laterally or circumferentially with respect to each other so that the area of the exit orifice always remains substantially circular. Conversely, as the nozzle 13 moves forwardly or inwardly relatively to the pipe 11 the sections 14 slide relatively to the end 11a of the pipe 11 and the outer extremities thereof diverge radially away from the center of said pipe.

The form of the nozzle 13 shown in Figs. 1 to 3 inc. and that shown in Figs. 4 to 6 inc., operate in exactly the same manner to control the characteristics of the exhaust gases passing through the conduit or tail pipe 11. In each instance, the reciprocatory movement of the nozzle 13 on the tail pipe 11 serves to increase or decrease the area of the exit orifice defined by the outer or aft ends of the leaves 15. In the nozzle 13 shown in Figs. 1 to 3 inc., the area of the exit orifice is altered or varied by the pivotal movement of the sections 14 about the end of the tail pipe 11 during their reciprocation on the tail pipe 11. In that form of the invention shown in Figs. 4 to 6 inc. the convergence or divergence of the sections 14 during their reciprocation on the tail pipe 11 is caused by the curvature of the leaves 15 and the sliding contact thereof with the end 11a of the tail pipe 11. However, in each instance the area of the exit orifice defined by the outer end limits of the leaves 15 is varied so as to increase or decrease by the reciprocation of the nozzle 13 on and relative to the tail pipe 11.

Similarly, the cooling of the nozzle 13 is accomplished in identically the same way in both embodiments or forms of the invention. The leaves 15 and 16 of both embodiments are fixedly held in spaced parallel relationship either by the web 17 (Figs. 1 to 3 inc.) or the studs 17ª (Figs. 4 to 6 inc.), but this relationship though parallel is staggered so that the leaves 16 overhang, or extend further aft or rearwardly, than the leaves 15 thus creating a low pressure zone or area between the aft extremities of the leaves 15 and 16. Since the pressure developed in this area is proportional to the velocity of the exhaust gases existing through the exit orifice defined by the aft limits of the leaves 15, the greater the velocity of the gases, the lower will be the pressure in this area with the result that more cooling air will be sucked or drawn through and between the leaves 15 and 16 as the velocity of the exiting gases increases.

What is claimed is:

1. The combination with the exhaust pipe of a jet engine, of a nozzle surrounding the discharge end of said pipe and arranged to reciprocate longitudinally thereof, said nozzle being composed of a plurality of overlapping, relatively movable sections combining to form a continuation of, and define an exit orifice for, said pipe, means for longitudinally reciprocating said nozzle sections relative to the discharge end of said pipe, and cam means slidably engaging said nozzle sections aft of the discharge end of said pipe whereby the reciprocation of said nozzle relatively adjusts the sections thereof to increase and decrease the effective area of the exit orifice aforesaid, said cam means being effective to prevent the outward radial displacement of said nozzle sections by the exhaust gases passing therethrough.

2. The combination with an exhaust pipe, of a nozzle adapted to slidably engage the outer surface of said pipe adjacent the discharge end thereof and define the exit orifice for said pipe comprising an operating ring, a plurality of nozzle sections pivotally connected to said ring, each section consisting of inner and outer leaves held in spaced superposed relationship and curved laterally to generally conform to the contour of said pipe, means for reciprocating said operating ring and sections longitudinally of said pipe, and means for moving said sections relatively to each other and to said pipe during the reciprocation of the nozzle as aforesaid to thereby vary the effective area of the exit orifice.

3. A nozzle adapted to be slidably mounted on the discharge end portion of a conduit to form and define an exit orifice for said conduit comprising an operating ring encircling said conduit, a plurality of nozzle sections pivotally secured to said ring and slidable on the end portion of said conduit, each section comprising an inner leaf and an outer leaf held in spaced and fixed superposed relationship and curved laterally to conform to the curvature of said conduit, means in association with said operating ring to reciprocate the operating ring and its attached nozzle sections in unison relatively to said conduit, and means for moving said sections relatively to each other during the reciprocation of the operating ring and sections as aforesaid to thereby vary the area of the exit orifice.

4. A variable area nozzle to form a continuation of and define the exit orifice for a conduit, said nozzle comprising a plurality of sections slidably mounted with reference to the discharge end of the conduit and to each other, means for reciprocating the sections in unison relatively to the discharge end of the conduit, and actuating means engaging the sections aft of the discharge end of the conduit and adapted to move the sections laterally with respect to each other during their reciprocation relative to the discharge end of the conduit to thereby vary the effective area of the exit orifice established by the nozzle for the conduit.

5. A variable area nozzle to form and define an exit orifice for a conduit comprising a plurality of sections slidable with reference to the conduit and to each other, each section consisting of a pair of spaced leaves fixedly secured to each other, means for reciprocating the sections in unison relatively to the conduit, means for moving the sections laterally with respect to each other during the reciprocation of said sections to thereby vary the area of said exit orifice, and means for circulating cooling air between the spaced leaves of the several sections of the nozzle.

6. A variable area nozzle comprising a plurality of reciprocable and relatively movable sections, each section consisting of a pair of superposed leaves fixedly held in spaced relationship and said sections being arranged with the edge portions of the leaves of each section in slideable engagement with the edge portions of the corresponding leaves of the next adjacent sections whereby the outer extremities of the inner leaves of the several sections combine to define an exit orifice, an operating member connected to the inner ends of all of said sections to reciprocate them in unison, and means whereby the aforesaid exit orifice may be restricted or expanded during and by the reciprocation of the sections.

7. A variable area nozzle comprising a plurality of reciprocable and relatively movable sections, each section consisting of a pair of superposed leaves fixedly held in spaced relationship and said sections being arranged with the edge portions of the leaves of each section in slideable engagement with the edge portions of the corresponding leaves of the next adjacent sections whereby the sections combine to define a generally circular exit orifice, a common operating member connected to the corresponding ends of all of said sections to reciprocate them in unison, and means whereby the sections of the nozzle may be moved relatively to restrict the area of the exit orifice upon the reciprocation of said sections in one direction and may be moved relatively in reverse to expand the area of the exit orifice upon the reciprocation of the sections in the opposite direction, the circular form of said orifice being maintained throughout such reciprocation.

8. A variable area nozzle comprising a plurality of reciprocable and relatively movable sections defining the exit orifice of the nozzle, each section consisting of an inner and an outer leaf superposed and spaced one from the other, means individual to each section for fixedly attaching the leaves thereof one to the other with one end of the outer leaf projecting beyond the adjacent end of the inner leaf and the opposite end of the inner leaf projecting beyond the adjacent end of the outer leaf, said sections being arranged with the edge portions of the leaves of each section in slideable, overlapping engagement with the edge portions of the corresponding leaves of the next adjacent sections, a single operating member attached to the ends of the several sections where the inner leaves project beyond the outer leaves thereof to reciprocate said sections in unison, and stationary means associated with all of said sections to cause their relative movement during the reciprocation thereof to dilate or restrict said exit orifice.

9. A variable area nozzle comprising a plurality of reciprocable and relatively movable sections defining the exit orifice of the nozzle, each section consisting of an inner and an outer leaf superposed and spaced one from the other, means individual to each section for fixedly attaching the leaves thereof one to the other with one end of the outer leaf projecting beyond the adjacent end of the inner leaf and the opposite end of the inner leaf projecting beyond the adjacent end of the outer leaf, said sections being arranged with the edge portions of the leaves of each section in slideable, overlapping engagement with the edge portions of the corresponding leaves of the next adjacent sections, a single operating member attached to the ends of the several sections where the inner leaves project beyond the outer leaves thereof to reciprocate said sections in unison, and stationary control means associated with all of said sections to move them relatively and symmetrically to restrict said exit orifice upon the movement of the sections in one direction and to dilate said exit orifice upon the movement of the sections in the opposite direction.

10. The combination with the exhaust pipe of a jet engine, of a variable area nozzle associated therewith comprising a plurality of reciprocable and relatively movable sections surrounding the end portion of said pipe and defining an exit orifice for it, each section consisting of an inner and an outer leaf bent laterally to conform generally to the contour of the exhaust pipe and bent transversely to provide convexion in the leaves of each section between the extremities thereof, the leaves of each section being superposed and spaced one from the other, and said sections being arranged with the edge portions of the leaves of each section in slideable, overlapping engagement with the edge portions of the corresponding leaves of the next adjacent sections, means interposed between the leaves of each section to fixedly secure them one to the other, a common operating member encircling the exhaust pipe for reciprocation relative thereto, connections between said operating member and corresponding ends of all of the nozzle sections, and stationary control means associated with the outer leaves of each of the sections to cause them to tilt relatively to the end of the exhaust pipe to restrict or dilate the exit orifice defined by the sections upon the reciprocation of the sections by the operating member.

11. The combination with the exhaust pipe of a jet engine, of a variable area nozzle associated therewith comprising a plurality of reciprocable and relatively movable sections surrounding the end portion of the pipe and defining an exit orifice for it, each section consisting of an inner and a bent leaf curved laterally to conform to the contour of the exhaust pipe and bent transversely to convex the leaves between the extremities thereof, the leaves of each section being superposed and spaced one from the other, and said sections being arranged with the edge portions of the leaves of each section in slideable overlapping engagement with the edge portions of the corresponding leaves of the next adjacent sections, means interposed between the leaves of each section to fixedly secure them one to the other, a common operating member encircling the aforesaid exhaust pipe for reciprocation relative thereto, connections between the operating member and all of the nozzle sections, a stationary bracket mounted beyond the end of the exhaust pipe individual to each section and in engagement with the surface of the outer leaves thereof, and a track fixed centrally to the outer surface of each outer leaf of the nozzle section for sliding engagement with the bracket aforesaid whereby the movement of the nozzle sections in one direction causes the outer ends thereof to converge toward the axis of the extremity of the exhaust pipe and the movement of the nozzle sections in the opposite direction causes the outer end thereof to diverge from the axis of the extremity of the exhaust pipe.

12. The combination with the exhaust pipe of a jet power plant, of a variable area nozzle associated therewith comprising a plurality of reciprocable and relatively movable sections surrounding the end portion of said pipe and defining an exit orifice for it, each section consisting of an inner leaf and an outer leaf superposed and spaced one from the other, a central web interposed between the leaves of each section and pierced by a cam opening between its extremities, a common operating means surrounding and reciprocable with reference to the exhaust pipe, connections between the inner extremities of the webs of all of the nozzle sections and said operating member, and a stationary control member surrounding the inner leaves of all of said sections and disposed within the cam openings of all of the webs thereof, whereby the movement of the nozzle sections in unison in one direction causes them to tilt on the extremity of the tail pipe to restrict the exit orifice defined thereby and the movement thereof in the opposite direction causes them to reversely tilt with reference to the extremity of the tail pipe and thereby dilate said exit orifice.

13. The combination with a tail pipe of a jet engine, of a variable area nozzle comprising a plurality of nozzle sections surrounding and reciprocable relative to the end portion of the tail pipe combining to define an exit orifice for said tail pipe, each section consisting of an inner and an outer leaf superposed and spaced one from the other, said leaves being bent laterally to correspond to the contour of the tail pipe and arranged with their edge portions in slideable overlapping engagement with the edge portions of the corresponding leaves of the next adjacent sections, a central web interposed between the inner and outer leaves of each section, having a cam opening therein medially of its ends, a single operating ring having a diameter larger than the outside diameter of the tail pipe mounted for reciprocation relatively to said tail pipe and connected to the webs of all of said sections whereby the reciprocation of the ring relative to the end portion of the tail pipe causes a reciprocation in unison of the nozzle sections relative to the extremity of the tail pipe, and a control ring encircling the inner leaves of all of said sections and passing through the cam openings of the webs of the sections, said control ring being mounted against movement beyond the extremity of the tail pipe, whereby upon the reciprocation of the nozzle sections in one direction, said control ring causes the nozzle sections to tilt inwardly about the extremity of the tail pipe to restrict the exit orifice defined thereby and upon the reciprocation of said sections in the opposite direction said control ring causes the nozzle sections to operate in a reverse direction about the extremity of the tail pipe thereby enlarging the exit orifice.

14. The combination with the tail pipe of a jet engine, of a variable area nozzle comprising a plurality of reciprocable and relatively movable sections defining an exit orifice for said tail pipe, each section consisting of an inner and an outer leaf superposed and spaced one from the other and curved to agree with the contour of said tail pipe, said sections being arranged with the edge portions of the leaves of each section in slideable and overlapping engagement with the edge portions of the corresponding leaves of the next adjacent section, a central web interposed between the leaves of each section to rigidly and fixedly secure said leaves one to the other with the outer extremity of the outer leaf of each section projecting beyond the outer extremity of the inner leaf of each section and with the inner extremity of each inner leaf projecting beyond the inner extremity of the outer leaf, said web having a cam opening therein medially of its length and the openings of all of said webs being aligned one with the other circumferentially of the nozzle, a control ring mounted against movement beyond the extremity of the tail pipe and passing through the cam openings of the webs of the several nozzle sections, and an operating ring reciprocatingly encircling the end portion of the tail pipe and connected to the inner extremities of the webs of all of said sections whereby the reciprocation of the operating ring relative to the tail pipe similarly reciprocates the nozzle sections relative to said control ring.

15. The combination with the exhaust pipe of a jet engine and a structure surrounding said pipe and spaced therefrom to define a space for circulating cooling air between the adjacent surfaces of said pipe and structure, of a nozzle associated with the discharge end of said pipe, comprising a plurality of sections each having spaced inner and outer leaves, said plurality of sections being constructed and arranged for lateral movement relative to each other and to define an exit orifice having a substantially circular effective area for said pipe, and means embodied in said nozzle to move said sections relatively to each other to uniformly and symmetrically vary the effective area of the exit orifice defined thereby while maintaining it substantially circular, each of said sections being disposed in part in the space between said pipe and structure whereby the cooling air therein passes between the spaced inner and outer leaves of each section to thereby cool the same.

16. The combination with a conduit and a structure surrounding said conduit and spaced therefrom to define a passage for cooling air between the adjacent surfaces of said conduit and structure, of a variable area nozzle associated with the discharge end of said conduit to form and define a substantially circular exit orifice for said conduit, said variable area nozzle comprising a plurality of sections slidable with reference to said conduit, each section consisting of a pair of spaced leaves fixedly secured to each other, and means for simultaneously reciprocating said sections in unison relative to said conduit and moving said sections laterally with respect to each other to thereby vary the effective area of said exit orifice while maintaining it substantially circular, said sections being disposed to receive the cooling air from said passage between the spaced leaves thereof to thereby cool said nozzle.

17. The combination with a conduit and a structure surrounding said conduit and spaced therefrom to define a passage for cooling air between the adjacent surfaces of said conduit and structure, of a variable area nozzle associated with the discharge end of said conduit to form and define an exit orifice having a substantially circular effective area for said conduit, said variable area nozzle comprising a plurality of sections slidable longitudinally with respect to said conduit and laterally with respect to each other, each section consisting of a pair of spaced superposed leaves fixedly secured to each other, means for reciprocating said sections in unison relative to said conduit, and means operatively associated with said sections and effective upon their reciprocation for moving said sections laterally with respect to each other to thereby vary the effective area of said exit orifice while maintaining it substantially circular, said sections being disposed to receive the cooling air from said passage between the spaced leaves thereof to thereby cool said nozzle.

18. The combination with a pipe for exhausting gases and a structure surrounding and spaced from said pipe to define a space therebetween for circulating air, of a nozzel for the discharge end of said pipe comprising a plurality of sections each having an inner and outer leaf curved to generally follow the contour of said pipe and held in fixed spaced relationship to each other with one end of the outer leaf projecting beyond the adjacent end of the inner leaf to form the outer end of the section, each of said sections arranged with the edge portons of its inner and outer leaves overlapping and slidably engaging the edge portions of the inner and outer leaves of the next adjacent sections and having its inner leaf slidably engaging the discharge end of said pipe with its outer end projecting beyond the discharge end of said pipe and its opposite end disposed in the space between said pipe and structure, whereby the ends of the inner leaves at the outer ends of the sections combine to define an exit orifice having a substantially circular effective area for said pipe and whereby exhaust gases passing through the exit orifice thus formed draw air from the space between said pipe and structure between and through the spaced leaves of the sections to cool the same, means operatively connected to the end of each of said sections disposed in the space between said pipe and structure for reciprocating them in unison longitudinally of the discharge end of said pipe, and means operatively associated with each of said sections to move them laterally with respect to each other during their reciprocation to thereby vary the effective area of the exit orifice while maintaining it substantially circular.

19. The combination with a pipe for exhausting gases and a structure surrounding and spaced from said pipe to define a space therebetween for circulating air, of a nozzle for the discharge end of said pipe comprising a plurality of sections each having an inner and outer leaf curved to generally follow the contour of said pipe and held in fixed spaced relationship to each other with one end of the outer leaf projecting beyond the adjacent end of the inner leaf to form the outer end of the section, each of said sections arranged with the edge portions of its inner and outer leaves overlapping and slidably engaging the edge portions of the inner and outer leaves of the next adjacent sections and having its inner leaf slidably engaging the discharge end of said pipe with its outer end projecting beyond the discharge end of said pipe and its opposite end disposed in the space between said pipe and structure, whereby the ends of the inner leaves at the outer ends of the sections combine to define an exit orifice for said pipe and whereby exhaust gases passing through the exit orifice thus formed draw air from the space between said pipe and structure between and through the spaced leaves of the sections to cool the same, and means operatively connected to each of said sections for reciprocating them in unison longitudinally of the discharge end of said pipe and concurrently moving them laterally with respect to each other to thereby vary the effective area of the exit orifice.

References Cited in the file of this patent

UNITED STATES PATENTS

| | | |
|---|---|---|
| 186,310 | Curtis | Jan. 16, 1877 |
| 2,462,953 | Eaton et al. | Mar. 1, 1949 |
| 2,514,248 | Lombard | July 4, 1950 |
| 2,597,253 | Melchior | May 20, 1952 |
| 2,697,907 | Gaubatz | Dec. 28, 1954 |

FOREIGN PATENTS

| | | |
|---|---|---|
| 588,501 | Great Britain | May 27, 1947 |
| 607,686 | Great Britain | Sept. 3, 1948 |